United States Patent
Zhang et al.

(10) Patent No.: US 9,820,261 B2
(45) Date of Patent: Nov. 14, 2017

(54) MAPPING METHOD AND APPARATUS FOR RESOURCE STATUS PROCESS

(75) Inventors: Dajun Zhang, Beijing (CN); Guoqing Li, Beijing (CN); Wei Bao, Beijing (CN)

(73) Assignee: China Academy Of Telecommunications Technology, Beijing (CN)

(*) Notice: Subject to any disclaimer, the term of this patent is extended or adjusted under 35 U.S.C. 154(b) by 0 days.

(21) Appl. No.: 13/703,316

(22) PCT Filed: Jun. 3, 2011

(86) PCT No.: PCT/CN2011/075323
§ 371 (c)(1),
(2), (4) Date: Mar. 18, 2013

(87) PCT Pub. No.: WO2011/153927
PCT Pub. Date: Dec. 15, 2011

(65) Prior Publication Data
US 2013/0201900 A1 Aug. 8, 2013

(30) Foreign Application Priority Data

Jun. 12, 2010 (CN) .......................... 2010 1 0205985
May 25, 2011 (CN) .......................... 2011 1 0137108

(51) Int. Cl.
*H04W 72/04* (2009.01)
*H04B 7/155* (2006.01)
(Continued)

(52) U.S. Cl.
CPC ........ *H04W 72/04* (2013.01); *H04B 7/15542* (2013.01); *H04W 84/047* (2013.01); *H04W 92/20* (2013.01)

(58) Field of Classification Search
CPC ..... H04W 92/20; H04W 36/22; H04W 24/10; H04W 28/08; H04W 72/0486;
(Continued)

(56) References Cited

U.S. PATENT DOCUMENTS

2009/0247150 A1* 10/2009 Fischer ................ H04W 24/10
455/425
2010/0103845 A1 4/2010 Ulupinar et al.
(Continued)

FOREIGN PATENT DOCUMENTS

| CN | 101600226 | | 12/2009 | |
|---|---|---|---|---|
| CN | 101600226 | A | 12/2009 | |
| EP | 2184935 | * | 5/2010 | ............ H04W 16/00 |

OTHER PUBLICATIONS

3GPP TS 36.423 V9.2.0 3rd Generation Partnership Project; Technical Specification Group Radio Access Network; Evolved Universal Terrestrial Radio Access Network (E-UTRAN); X2 application protocol (X2AP) (Release 9), (Mar. 2010), 120 Pages.*

(Continued)

*Primary Examiner* — Edan Orgad
*Assistant Examiner* — Ivan O Latorre
(74) *Attorney, Agent, or Firm* — Ladas & Parry, LLP

(57) ABSTRACT

The present invention discloses a mapping method and apparatus for resource status process, and the method comprises the following steps: DeNB receives resource status information from RN; said DeNB acquires the address of source eNB according to said resource status information and context information; said DeNB sends said resource status information to said source eNB according to the address of said source eNB. In the present invention, context information on DeNB is established for source eNB to enable DeNB to route resource status response message or (Continued)

resource status report to correct source eNB apparatus according to context information.

17 Claims, 5 Drawing Sheets

(51) Int. Cl.
    *H04W 84/04* (2009.01)
    *H04W 92/20* (2009.01)

(58) Field of Classification Search
    CPC ............. H04W 72/0426; H04W 72/04; H04W 84/047; H04W 40/04; H04W 28/00; H04B 7/15542
    USPC ............... 370/315, 401, 474, 338, 235, 331; 455/436, 453, 425, 423, 67.11
    See application file for complete search history.

(56) References Cited

U.S. PATENT DOCUMENTS

| | | | | |
|---|---|---|---|---|
| 2010/0103862 | A1* | 4/2010 | Ulupinar | H04L 29/12207 370/315 |
| 2010/0260096 | A1* | 10/2010 | Ulupinar et al. | 370/315 |
| 2010/0260109 | A1* | 10/2010 | Ulupinar et al. | 370/328 |
| 2010/0260126 | A1* | 10/2010 | Ulupinar | H04B 7/2606 370/329 |
| 2011/0009067 | A1* | 1/2011 | Iwamura | H04W 24/10 455/67.11 |
| 2011/0053598 | A1* | 3/2011 | Ahluwalia | 455/436 |
| 2011/0208842 | A1* | 8/2011 | Mildh | H04B 7/155 709/220 |
| 2011/0222428 | A1* | 9/2011 | Charbit | H04B 7/15557 370/252 |
| 2011/0280127 | A1* | 11/2011 | Raaf et al. | 370/230 |
| 2012/0044836 | A1* | 2/2012 | Sivavakeesar | H04W 24/02 370/255 |
| 2012/0218886 | A1* | 8/2012 | Van Phan | H04B 7/15592 370/229 |
| 2013/0039185 | A1* | 2/2013 | Teyeb et al. | 370/235 |

OTHER PUBLICATIONS

3GPP TSG-RAN WG2 Meeting #69bis R2-102659 Stage-2 description of relaying into 36.300, Beijing, China, Apr. 12-16, 2010, 23 Pages.*
3GPP TSG-RAN WG3 #68 R3-101600 on the X2 Proxy in DeNB, Montreal, Canada, May 10-14, 2010, 3 Pages.*
3GPP TSG RAN WG3 Meeting #68 R3-101620 Neighbour Discovery and Neighbour Management with Relays, Montreal, Canada, May 10-14, 2010, 5 Pages.*
ISR for related PCT/CN2011/075323 dated Sep. 15, 2011.
"3GPP TS 36.423 V8 4.0 $3^{rd}$ Generation Partnership Project; Technical Specification Group Radio Access Network; Evolved Universal Terrestrial Radio Access Network (E-UTRAN) X2 application protocol (X2AP) (Release 8)" $3^{rd}$ Generation Partnership Project (3GPP); Technical Specification (TS), Dec. 2008, Part 8.3.6.
Office action dated May 6, 2013 from corresponding Chinese Patent Application No. 201110137108.1 and its English translation.
Office action dated Nov. 7, 2013 from corresponding Chinese Patent Application No. 201110137108.1 and its English translation.
On the X2 Proxy in DeNB, 3GPP TSG-RAN WG3 Meeting #68, R3-101600 Montreal, Canada, May 10-14, 2010.
Written Opinion for related PCT/CN2011/075323 dated Sep. 15, 2011 and its English translation.
Extended European Search report dated Apr. 3, 2017 for corresponding EPO Patent Application No. 11791918.3.
Partial Supplementary European Search Report dated Dec. 12, 2016 for corresponding EPO Patent Application No. 11791918.3.
Huawei, "X2 interface analysis for relay"; 3GPP TSG RAN WG3 #65bis; Miyazaki, Japan, Oct. 12-15, 2009; 2 pages.
"LTE; Evolved Universal Terrestrial Radio Access Network (E-UTRAN); X2 Application Protocol (X2AP) (3GPP TS 36.423 version 9.2.0 Release 9)", ETSI TS 136 423 version. 9.2.0 release 9, Apr. 2010, pp. 1-120.

* cited by examiner

MAPPING METHOD AND APPARATUS FOR RESOURCE STATUS PROCESS

CROSS REFERENCE TO RELATED APPLICATIONS

This application is the U.S. national stage of international patent application no. PCT/CN2011/075323 filed on Jun. 3, 2011, which claims priority to Chinese Patent Application No. 201010205985.3 entitled "Mapping Method and Apparatus for Resource Status Process" filed in the patent office of the People's Republic of China on Jun. 12, 2010, and to Chinese Patent Application No. 201110137108.1 entitled "A Mapping Method and Apparatus for Resource Status Process" filed in the patent office of the People's Republic of China on May 25, 2011, the disclosures of which are incorporated by reference herein.

FIELD OF THE INVENTION

The present invention relates to the field of communication technology, in particular to the mapping method and apparatus for resource status process.

BACKGROUND OF THE INVENTION

LTE (Long Term Evolution) evolves from 3G (3rd Generation), which improves and strengthens air access technology of 3G, and provides peak rate of 100 Mbit/s at downlink and 50 Mbit/s at uplink under 20 MHz spectral bandwidth to improve the performance of edge user of a cell, increase cell capacity and reduce system delaying.

With rapid growth of the quantity of mobile terminal users, business capacity of terminal users increases exponentially. To meet increasing business requirements of terminal users, it is necessary to provide the greater bandwidth to meet higher peak rate for terminal users' business and application. That is to say in the future mobile communication system, such as B3G (Beyond three Generation) and LTE-A (LTE-Advanced), the system will provide higher peak data rate and cell throughput and require larger bandwidth at the same time. At present, few bandwidths less than 2 GHz is undistributed. Therefore, part of or all bandwidths required by B3G system (take B3G system as an example) can only be found at higher frequency band, such as frequency band above 3 GHz. In practical application, the attenuation of radio propagation will become faster and transmission distance will become shorter with higher frequency band; that is to say more eNBs are required in the same coverage area to ensure continuous coverage. It costs too much to build an eNB. Therefore, it will increase the cost of network creation when many eNBs are required. To solve the above problem, manufacturers and organizations for standardization introduce relay into cellular system to increase coverage area.

Network architecture after RN (Relay Node) is introduced into an LTE-A system is shown in FIG. 1. RN is connected to core net through donor cell under eNB (Evolved Node B) and has no direct wired interface with core net. Each RN can control one or more cells.

Under the network architecture, the interface between UE (User Equipment) and RN is called Uu interface, while that between RN and DeNB (Donor Evolved Node B) is called Un interface. Multiple RNs can be connected under one DeNB, while one RN can only be connected to one DeNB.

The diagram of resource status process according to the present technology is shown in FIG. 2, including: eNB1 sends RESOURCE STATUS REQUEST message to eNB2 and eNB2 returns RESOURCE STATUS RESPONSE message to eNB1.

In course of implementing the present invention, the inventor finds out there are at least the problems below according to the present technology: In present LTE system, Measurement ID is used in resource status request message to identify each resource status request message. With the deployment of Relay, if it needs to implement resource status report process for cross DeNB, target cell identification can be used as routing information, thus DeNB can send resource status request message to target node according to such identification.

However, DeNB is only used for transparent transmission without address information of source node. For the returned resource status response message and the following status report, it fails to find out correct source node for address information of source node is not specified and may result in routing failure as shown in FIG. 3.

SUMMARY OF THE INVENTION

The present invention provides a mapping method and apparatus for resource status process to route resource status response message and status report to correct source eNB apparatus.

To achieve the above objective, the embodiments of the present invention provide the mapping method for resource status process, including:

DeNB receives resource status request message from source eNB; and said resource status request message includes the cell information to be reported;

Said DeNB allocates Measurement ID for said source eNB in accordance with said resource status request message;

Said DeNB sends resource status request message carrying said Measurement ID to RN.

The embodiments of the present invention provide a kind of mapping apparatus for resource status process, including:

Reception module, which is used to receive resource status request message from source eNB; and said resource status request message includes the cell information to be reported;

Processing module, which is used to allocate Measurement ID for said source eNB in accordance with said resource status request message received by said reception module;

Sending module, which is used to send resource status request message carrying said Measurement ID to RN.

The embodiments of the present invention provide the mapping method for resource status process, including:

Source eNB shall acquire resource status request message; and said resource status request message includes the cell information to be reported;

Said source eNB shall send said resource status request message to DeNB;

Said source eNB shall receive resource status information returned by said DeNB according to context information.

The embodiments of the present invention provide a kind of mapping apparatus for resource status process, including:

Acquisition module, which is used to acquire resource status request message; and said resource status request message includes the cell information to be reported;

Sending module, which is used to send said resource status request message acquired by said acquisition module to DeNB;

Reception module, which is used to receive resource status information returned by said DeNB according to context information.

Compared with the present technology, the embodiments of the present invention at least possess the following advantages:

Context information for source eNB is established on DeNB to enable DeNB to route resource status response message or status report to correct source eNB apparatus.

DETAILED DESCRIPTION OF THE EMBODIMENTS OF THE PRESENT INVENTION

In LTE-A system, RN is introduced to increase network coverage. It is connected with DeNB wirelessly. DeNB can terminate or agent all signalling messages of X2 interface. To solve the problem that it fails to route resource status response message and status report to correct source eNB apparatus according to the present technology, the embodiments of the present invention provide the mapping method and apparatus for resource status process to enable DeNB (agent node) to correctly route resource status response message and status report to source node through termination mapping mechanism for resource status process.

Embodiment I

Figure 4:
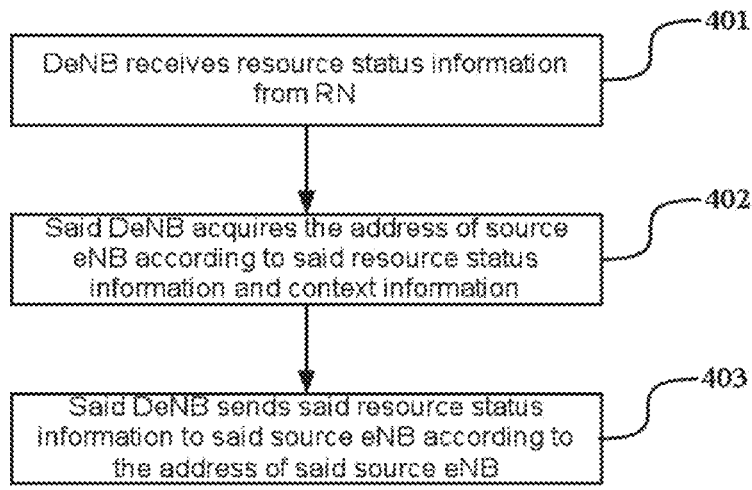
FIG. 4 is a flow diagram of the mapping method for resource status process provided by Embodiment I of the present invention.

The embodiments of the present invention provide the mapping method for resource status process as shown in FIG. 4, which comprises the following steps:

Step 401: DeNB receives resource status information from RN.

Step 402: Said DeNB acquires the address of source eNB according to said resource status information and context information.

Step 403: Said DeNB sends said resource status information to said source eNB according to the address of said source eNB. Said resource status information includes: resource status response message or resource status report.

In the embodiments of the present invention, the steps before said DeNB receives resource status information from RN also include: said DeNB receives resource status request message from said source eNB; said resource status request message contains the cell information to be reported; said DeNB allocates Measurement ID for said source eNB in accordance with said resource status request message and establish context information for source eNB, where the corresponding relation between said Measurement ID and eNB is stored; said DeNB sends resource status request message to RN.

Furthermore, said DeNB establishes context information for said source eNB, including: if said cell information to be reported corresponds to multiple RNs, said DeNB establishes context information of Measurement ID corresponding to that of multiple RNs for said source eNB; or, if said cell information to be reported corresponds to one RN, said DeNB establishes context information of Measurement ID corresponding to that of one RN for said source eNB.

Said DeNB sends resource status request message to RN, including: if said cell information to be reported corresponds to multiple RNs, said DeNB structures resource status request message corresponding to each RN according to resource status request message from said source eNB, and sends corresponding resource status request message to each RN respectively; if said cell information to be reported corresponds to one RN, said DeNB sends resource status request message from said source eNB directly to RN.

In the embodiments of the present invention, said DeNB acquires the address of said source eNB according to said resource status information and context information, including: said DeNB acquires said Measurement ID according to said resource status information, and the address of said source eNB according to said Measurement ID and corresponding relation between Measurement ID stored in said context information and said source eNB.

Said DeNB sends said resource status information to said source eNB according to the address of said source eNB, including: if said cell information to be reported corresponds to multiple RNs, said DeNB structures uniform resource status information according to resource status information from said multiple RNs and sends said uniform resource status information to said source eNB according to the address of said source eNB; if said cell information to be reported corresponds to one RN, said DeNB sends resource status information from RN directly to said source eNB according to the address of said source eNB.

It can thus be seen that in the embodiments of the present invention, by establishing context information for source eNB on DeNB, DeNB can route resource status response message or resource status report to the correct source eNB apparatus.

To explain the technical solution provided by the embodiments of the present invention more clearly, the mapping method for the resource status process will be expounded below in combination with specific embodiment. The termination of resource status process on DeNB is explained in the embodiments of the present invention.

It should be noted that the technical solution provided by the embodiments of the present invention can be applied to routing processes of resource status response message, status report or other messages according to actual requirements. To facilitate description, the processing process of resource status response message shall be taken as an example to explain in the embodiments of the present invention, while processing method of status report is not expounded herein for it is the same as that of resource status response message.

Embodiment II

Figure 5:
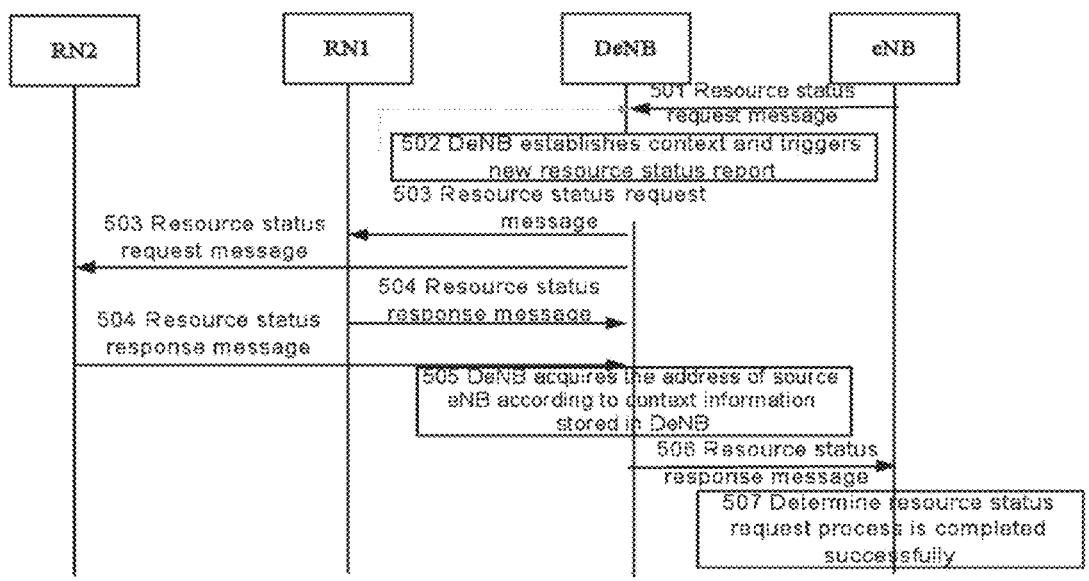
FIG. 5 is a flow diagram of the mapping method for resource status process provided by Embodiment II of the present invention.

As shown in FIG. 5, Embodiment II of the present invention provides the mapping method for resource status process, which comprises the following steps:

Step 501: eNB sends resource status request message to DeNB.

Figure 1:
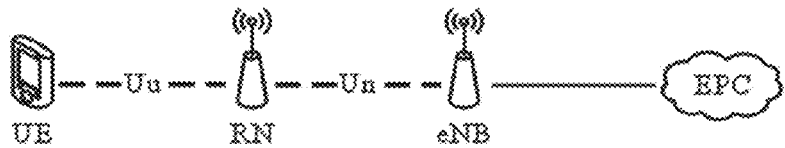
FIG. 1 is a diagram of network architecture after RN is introduced into LTE-A system according to the present technology.
Figure 2:
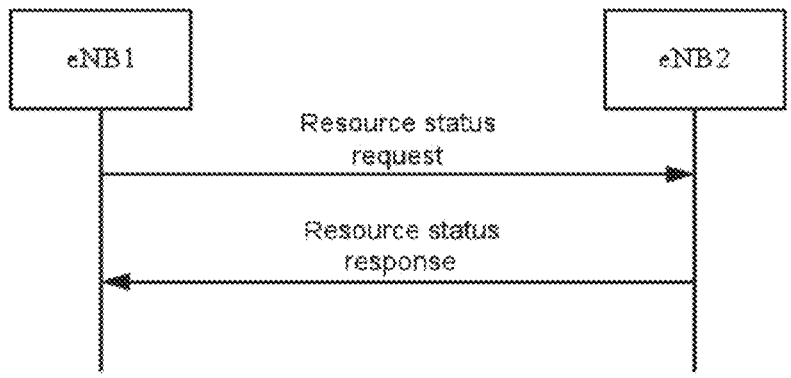
FIG. 2 is a diagram of resource status process according to the present technology.

To be specific, based on load equilibration strategy, when eNB determines to launch resource status report process, it is necessary for eNB to send resource status request message to DeNB and specifies all cell lists to be reported in resource status request message as shown in FIG. 1.

TABLE 1

| Cell To Report | 1 to maxCellineNB | Cell ID list for which measurement is needed |
| --- | --- | --- |
| >Cell ID | M | ECGI 9.2.14 |

Step 502: DeNB establishes context and triggers new resource status report.

To be specific, after receiving resource status request message from other eNB, the DeNB needs to establish context and allocate corresponding Measurement ID. If target cell belongs to external node (namely target RN), it is necessary to complete the mapping of Measurement ID.

Herein, if there is one target RN, the mapping relation of Measurement ID can be one-to-one. If there are multiple RNs, the mapping relation of Measurement ID can be one-to-many.

The cells taking target cells as RN1 and RN2 are taken as the example to explain in the embodiments of the present invention. The mapping of Measurement ID is shown in Table 2.

TABLE 2

| eNB | DeNB | RN1 | RN2 |
| --- | --- | --- | --- |
| eNB1 Measurement ID 1 | eNB2 Measurement ID 1 | | |
| | eNB1 Measurement ID 2 | eNB2 Measurement ID | |
| | eNB1 Measurement ID 3 | | eNB2 Measurement ID 3 |

Furthermore, it is necessary for DeNB to trigger new resource status report based on the target cell information in resource status request message. If target cell refers to multiple external nodes (RN1 and RN2 are taken as the example in the embodiments of the present invention), request process of multiple resources statuses will be triggered.

Step 503: DeNB sends resource status request messages to different target RNs respectively.

In the embodiments of the present invention, target RN refers to RN1 and RN2. Thus, DeNB needs to send resource status request messages to RN1 and RN2 respectively.

To be specific, resource status request message from eNB refers to such message of RN1 and RN2. Therefore, DeNB needs to structure new resource status request message for RN1 and RN2 respectively and send such message corresponding to RN1 and RN2 respectively to them.

Step 504: Target RN implements resource status measurement and returns resource status response message to DeNB.

To be specific, after receiving resource status request message from DeNB, RN needs to allocate corresponding Measurement ID and structure proper resource status response message to send the resource status response message to DeNB.

In the embodiments of the present invention, RN1 and RN2 will implement the aforesaid operations and return resource status response message to DeNB respectively.

Step 505: DeNB acquires the address of source eNB according to context information stored in DeNB.

To be specific, for resource status response message carries the information on Measurement ID, DeNB needs to acquire the address information of source eNB according to context information stored in DeNB itself and the information on Measurement ID after receiving resource status response message from all target cells.

Step 506: DeNB structures new resource status response message and sends such message to source eNB according to the acquired address of source eNB.

To be specific, resource status request message from eNB refers to such message for RN1 and RN2. Therefore, DeNB needs to return such message when it returns resource status request message to eNB.

In this step, after resource status response messages from RN1 and RN2 are received, it is necessary to integrate such messages to structure a new resource status response message for RN1 and RN2 and send the new message to source eNB according to the acquired address of source eNB.

Step 507: Source eNB receives resource status response message to determine that resource status request process is completed successfully.

Figure 6:
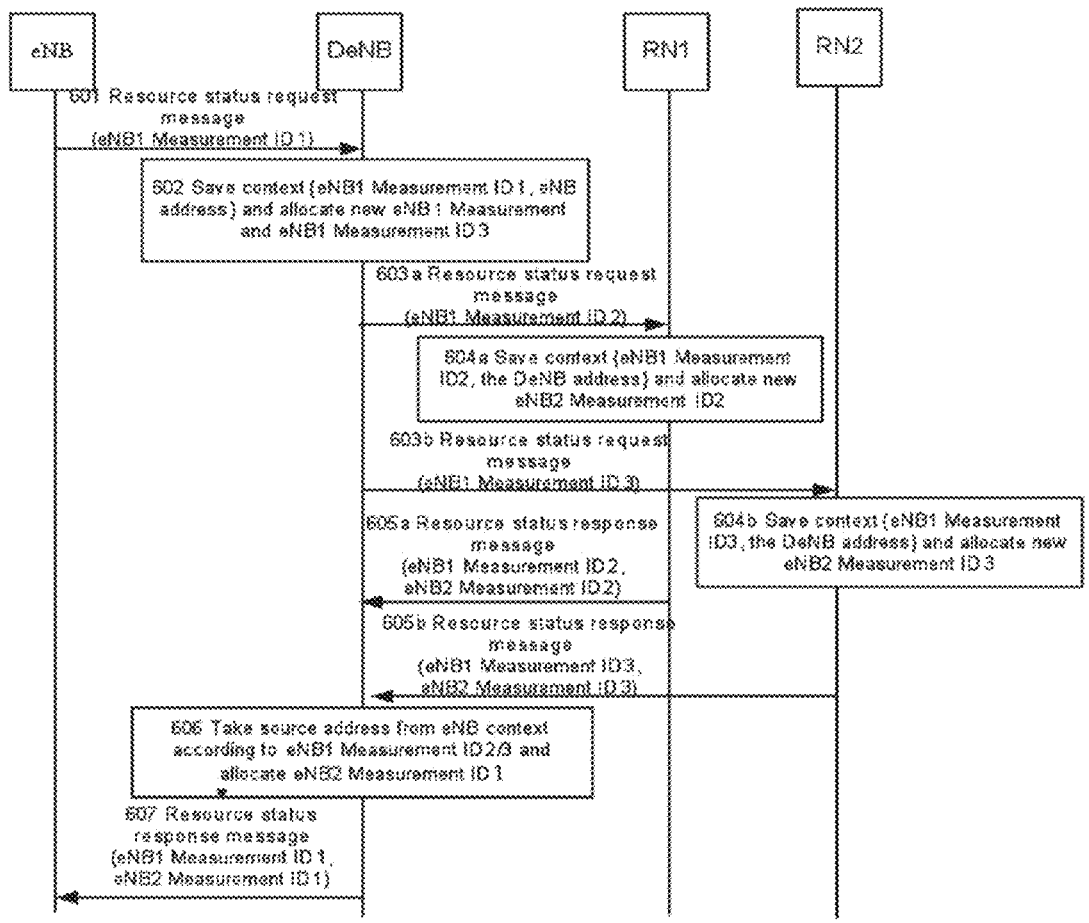
FIG. 6 is a diagram of mapping process of Measurement ID in Embodiment II of the present invention.

To further explain the mapping method for resource status process provided by Embodiment II of the present invention, the mapping process of Measurement ID is further elaborated below, and corresponding mapping process for completing Measurement ID is shown in FIG. 6, which comprises the following steps:

Step 601: eNB sends resource status request message to DeNB. Such message carries the information on eNB1 Measurement ID1 and Cell ID list to report.

Step 602: DeNB saves context {eNB1 Measurement ID1, eNB address} and allocates new eNB1 Measurement ID2 and eNB1 Measurement ID3 to determine target address according to Cell ID list to report. Herein, eNB1 Measurement ID2 refers to the Measurement ID corresponding to RN1, while eNB1 Measurement ID3 refers to that corresponding to RN2.

Step 603a: DeNB sends resource status request message to RN1. Such message carries the information on eNB1 Measurement ID2 and Cell ID list to report.

Step 603b: DeNB sends resource status request message to RN2. Such message carries the information on eNB1 Measurement ID3 and Cell ID list to report.

Step 604a: RN1 saves context {eNB1 Measurement ID2, the DeNB address} and allocates new eNB2 Measurement ID2.

Step 604b: RN2 saves context {eNB1 Measurement ID3, the DeNB address} and allocates new eNB2 Measurement ID3.

Step 605a: RN1 sends resource status response message to DeNB. Such message carries the information on eNB1 Measurement ID2 and eNB2 Measurement ID2.

Step 605b: RN2 sends resource status response message to DeNB. Such message carries the information on eNB1 Measurement ID3 and eNB2 Measurement ID3.

Step 606: DeNB takes the source address from source eNB according to eNB1 Measurement ID2/3 and allocates eNB2 Measurement ID1.

Step 607: DeNB sends resource status response message to eNB. Such message carries the information on eNB1 Measurement ID1 and eNB2 Measurement ID1.

It can thus be seen that in the embodiments of the present invention, by establishing context information for source eNB on DeNB, DeNB can route resource status response message or resource status report to the correct source eNB apparatus according to said context information.

Embodiment III

Figure 7:
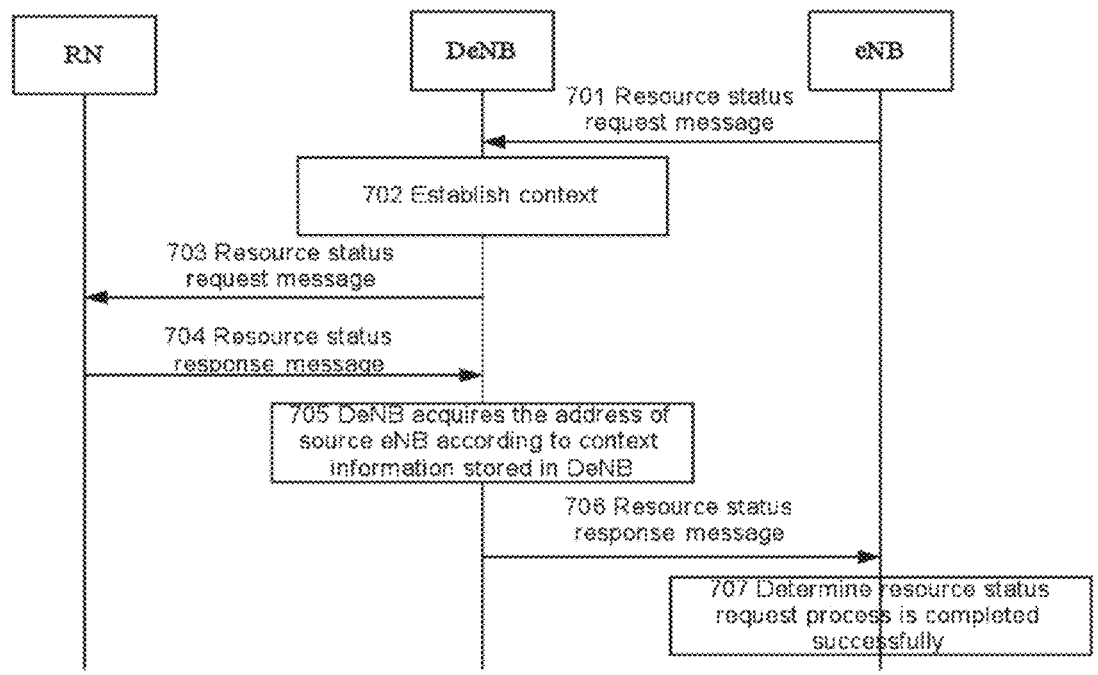
FIG. 7 is a flow diagram of the mapping method for resource status process provided by Embodiment III of the present invention.

As shown in FIG. 7, Embodiment III of the present invention provides one mapping method for resource status process. The termination of resource status process in target cell is taken as the example to explain in the embodiments of the present invention. The method comprises the following steps:

Step 701: eNB sends resource status request message to DeNB.

To be specific, based on load equilibration strategy, when eNB determines to launch resource status report process, it is necessary for eNB to send resource status request message to DeNB and specifies all cell lists to be reported in resource status request message.

It should be noted that in the embodiments of the present invention, eNB needs to differentiate different target nodes to launch resource status report process independently, and specify all cell lists to be reported under target node during the process.

Step 702: DeNB establishes context.

To be specific, after receiving resource status request message from other eNB, DeNB needs to establish context and allocate corresponding Measurement ID. If target cell belongs to external node, it is necessary to complete the mapping of Measurement ID.

Figure 3:
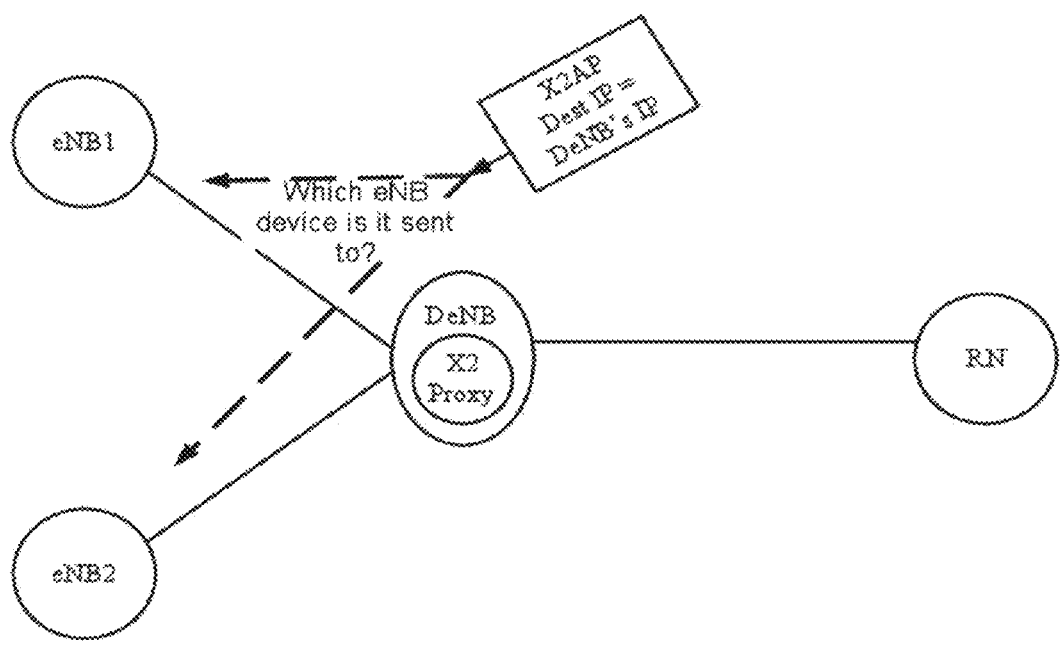
FIG. 3 is a diagram of routing failure according to the present technology.

Resource status request message refers to the independently-launched resource status report process for target node. Therefore, there is one target RN and the mapping relation of Measurement ID is one-to-one as shown in FIG. 3.

TABLE 3

| eNB | DeNB | RN |
|---|---|---|
| eNB1 Measurement ID 1 | eNB2 Measurement ID 1 | |
| | eNB1 Measurement ID 2 | eNB2 Measurement ID 2 |

In the embodiments of the present invention, the mapping process of Measurement ID is similar to that of Measurement ID as shown in FIG. 6, only the quantity of target RNs is changed to 1 in the embodiments of the present invention from 2. Therefore, it is not described here.

Step 703: DeNB sends resource status request message to target RN.

Step 704: Target RN implements resource status measurement and returns resource status response message to DeNB.

To be specific, after receiving resource status request message from DeNB, RN needs to allocate corresponding Measurement ID and structure proper resource status response message to send resource status response message to DeNB.

Step 705: DeNB acquires the address of source eNB according to context information stored in DeNB.

To be specific, for resource status response message carries the information on Measurement ID, DeNB needs to acquire the address information of source eNB according to the context information stored in it and the information on Measurement ID after receiving resource status response message from target cell.

Step 706: DeNB sends resource status response message to source eNB according to the acquired address of source eNB.

Step 707: Source eNB receives resource status response message to determine that resource status request process is completed successfully.

It can thus be seen that in the embodiments of the present invention, by establishing context information for source eNB on DeNB, DeNB can route resource status response message or resource status report to the correct source eNB apparatus according to said context information.

Embodiment IV

Figure 8:
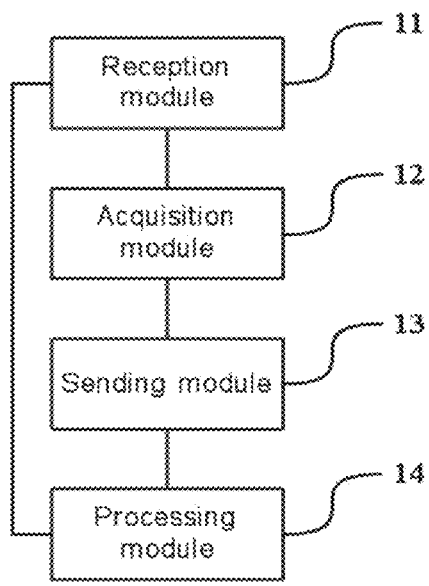
FIG. 8 is a structure diagram of the mapping apparatus for resource status process provided by Embodiment IV of the present invention.

Based on the same inventive concept as the method mentioned above, Embodiment IV of the present invention also provides the mapping apparatus for resource status process as shown in FIG. 8, including:

Reception module 11, which is used to receive resource status information from RN.

Acquisition module 12, which is used to acquire the address of source eNB according to said resource status information and context information received by said reception unit 11.

Sending module 13, which is used to send said resource status information to source eNB according to the address of source eNB acquired by said acquisition unit 12.

In the embodiments of the present invention, said reception module 11 is also used to receive resource status request message from said source eNB; such message contains the cell information to be reported;

Said apparatus also includes:

Processing module 14, which is used to allocate Measurement ID and establish context information for said source eNB according to said resource status request message received by said reception module 11. Said context information saves the corresponding relation between said Measurement ID and source eNB.

Said sending module 13, which is also used to send resource status request message to RN.

Furthermore, said processing module 14, which is specifically used to establish context information of Measurement ID corresponding to that of multiple RNs for said source eNB if said cell information to be reported corresponds to multiple RNs; or, Establish context information of Measurement ID corresponding to that of one RN for said source eNB if said cell information to be reported corresponds to one RN.

Said sending module 13, which is specifically used to construct resource status request message corresponding to each RN according to resource status request message from said source eNB and send corresponding resource status request message to each RN if said cell information to be reported corresponds to multiple RNs;

Send resource status request message from said source eNB directly to the RN if said cell information to be reported corresponds to one RN.

In addition, in the embodiments of the present invention,

Said acquisition module 12, which is specifically used to acquire said Measurement ID according to said resource status information and the address of said source eNB according to said Measurement ID and the corresponding relation between Measurement ID stored in said context information and source eNB.

Said sending module 13, which is specifically used to construct the uniform resource status message according to resource status message from said multiple RNs and send such message to said source eNB according to the address of source eNB if said cell information to be reported corresponds to multiple RNs;

If said cell information needing to be reported corresponds to an RN, directly send resource status information from said RN to said source eNB according to address of said source eNB.

In the embodiments of the present invention, said resource status information includes: resource status response message or resource status report.

Herein, modules of the inventive apparatus can be integrated or deployed separately. Said modules can be either combined into one module or further decomposed into multiple submodules.

In conclusion, commonly adopt the equipment provided through this invention and establish context information for source eNB on DeNB to enable DeNB to route resource status response message or resource status report to the correct source eNB equipment according to said context information.

Embodiment V

Figure 9:
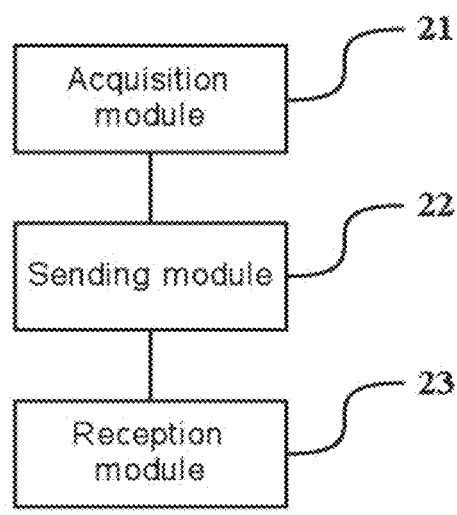
FIG. 9 is a structure diagram of the mapping apparatus for resource status process provided by Embodiment V of the present invention.

Based on the same inventive concept as the method mentioned above, Embodiment V of the present invention also provides the mapping apparatus for resource status process as shown in FIG. 9, including:

Acquisition module 21, which is used to acquire resource status request message; such message contains the cell information to be reported;

Sending module 22, which is used to send said resource status request message acquired by said acquisition module 21 to DeNB;

Reception module 23, which is used to receive resource status information returned by said DeNB according to context information.

In the embodiments of the present invention, said acquisition module 22 is specifically used to acquire the cell information to be reported under all RNs and structure resource status request message for such information; or, Acquire cell information needing to be reported under each RN and construct resource status request message for cell information needing to be reported under each RN.

In the embodiments of the present invention, said resource status information includes: resource status response message or resource status report.

Herein, modules of the inventive apparatus can be integrated or deployed separately. Said modules can be either combined into one module or further decomposed into multiple submodules.

In conclusion, commonly adopt the equipment provided through this invention and establish context information for source eNB on DeNB to enable DeNB to route resource status response message or resource status report to the correct source eNB equipment according to said context information.

Through description of the above embodiments, technical personnel of the field can clearly understand that the present invention is realized depending on software and necessary general hardware platform, and also can be realized through hardware, while the former is better in many cases. Based on this understanding, the technical solution of the present invention or the part making contributions to available technology can be essentially reflected by means of software product. This computer software product is stored in a storage medium, including several instructions to enable a computer unit (such as personal computer, sever, or network equipment, etc.) to implement the methods described in all embodiments of the present invention.

Technical personnel of the field can understand that the attached drawings only refer to the diagrams of a preferred embodiment, and the module or procedure included is not necessary for the implementation of the embodiments of the present invention.

Technical personnel of the field can understand that the module of the unit of an embodiment can be distributed in such embodiment's unit according to embodiment description, or located in one or more units of other embodiment through corresponding changes. Modules of the embodiments mentioned above can be merged into one module, or further divided into multi-submodules.

The number of the aforementioned embodiments of the present invention is only for the purpose of description rather than representing advantages or disadvantages.

Only several specific embodiments of the present invention are released above. However, the present invention is not only comprised of those. Any change that technical personnel of the field can predict shall be protected by the present invention.

The invention claimed is:

1. A method for realizing a resource status mapping process in a Long Term Evolution Advanced (LTE-A) system where one or more Relay Nodes (RNs) are connected with a source evolved Node B (eNB) via a Donor evolved Node B (DeNB), the method comprising:
   receiving, by the DeNB, a resource status request message from the source eNB, wherein the resource status request message includes cell information to be reported;
   allocating, by the DeNB, a Measurement ID to the source eNB in accordance with the resource status request message;
   establishing, by the DeNB, context information for the source eNB, wherein the context information stores therein a corresponding relationship between the allocated Measurement ID and the source eNB; and
   sending, by the DeNB, the resource status request message carrying the Measurement ID to the one or more RNs.

2. The method as claimed in claim 1, wherein
   the context information stores therein a corresponding relationship between the allocated Measurement ID and a Measurement ID corresponding to the Measurement ID allocated to the source eNB.

3. The method as claimed in claim 2, wherein subsequent to the DeNB sending the resource status request message carrying the Measurement ID to the RN, the method further comprises:

receiving, by the DeNB, resource status information from the RN, wherein the resource status information carries the allocated Measurement ID;

acquiring, by the DeNB, an address of the source eNB according to the resource status information and the context information; and sending, by the DeNB, the resource status information carrying the allocated Measurement ID of the source eNB to the source eNB according to the address of the source eNB.

4. The method as claimed in claim 3, wherein the DeNB acquiring the address of the source eNB according to the resource status information and the context information, comprises: acquiring, by the DeNB, the allocated Measurement ID according to the resource status information, and acquiring the address of the source eNB according to the allocated Measurement ID as well as the corresponding relationship between the allocated Measurement ID and the source eNB stored in the context information.

5. The method as claimed in claim 3, wherein the DeNB sending the resource status information carrying the allocated Measurement ID of the source eNB to the source eNB according to the address of the source eNB, comprises:

if the cell information to be reported corresponds to multiple RNs, the DeNB setting up uniform resource status information according to respective resource status information from the multiple RNs and sending the uniform resource status information to the source eNB according to the address of the eNB; or, if the cell information to be reported corresponds to one RN, the DeNB sending the resource status information from the RN directly to the source eNB according to the address of the eNB.

6. The method as claimed in claim 2, wherein if the cell information to be reported corresponds to multiple RNs, a Measurement ID is allocated to each RN when the DeNB allocates the Measurement ID to the source eNB; wherein the corresponding relationships between the allocated Measurement ID of the source eNB stored in the context information are respective relationships between the allocated Measurement ID of the source eNB and respective Measurement IDs allocated to respective RNs; or, if the cell information to be reported corresponds to one RN, a Measurement ID is allocated to the RN when the DeNB allocates the Measurement ID to the source eNB; wherein the corresponding relationship between the allocated Measurement ID and Measurement ID corresponding to the Measurement ID allocated to the source eNB stored in the context information is a relationship between the Measurement ID of the source eNB and the Measurement ID allocated to the RN.

7. The method as claimed in claim 1, wherein the DeNB sending the resource status request message carrying the Measurement ID to RN, comprises:

if the cell information to be reported corresponds to multiple RNs, the DeNB setting up a resource status request message corresponding to each RN according to a resource status request message from the source eNB and sending a corresponding resource status request message to each RN respectively; or, if the cell information to be reported corresponds to one RN, the DeNB sending a resource status request message from the source eNB directly to the RN.

8. The method as claimed in claim 3, wherein the resource status information includes: a resource status response message or a resource status report.

9. An apparatus for realizing a resource status mapping process in a Long Term Evolution Advanced (LTE-A) system where one or more Relay Nodes (RNs) are connected with a source evolved Node B (eNB) via a Donor evolved Node B (DeNB), the apparatus comprising:

a processor;

a memory, which is connected with the processor and stores program and data used when the processor executes; and a transceiver, which communicates with other communication devices over a transmission medium, wherein the apparatus realizes the following processing, when the program and data stored in the memory are called and executed by the processor;

receiving, by the DeNB, a resource status request message from the source eNB, wherein the resource status request message includes cell information to be reported;

allocating, by the DeNB, a Measurement ID to the source eNB in accordance with the resource status request message;

establishing, by the DeNB, context information for the source eNB, wherein the context information stores therein a corresponding relationship between the allocated Measurement ID and the source eNB; and sending, by the DeNB, the resource status request message carrying the Measurement ID to the one or more RNs.

10. The apparatus as claimed in claim 9, wherein the context information stores therein a corresponding relationship between the allocated Measurement ID and a Measurement ID corresponding to the Measurement ID allocated to the source eNB.

11. The apparatus as claimed in claim 10, wherein the apparatus is configured for receiving resource status information from the RN, wherein the resource status information carries the allocated Measurement ID;

the apparatus is configured for acquiring an address of the source eNB according to the resource status information and the context information;

the apparatus is configured for sending the resource status information carrying the allocated Measurement ID of the source eNB to the source eNB according to the address of source eNB.

12. The apparatus as claimed in claim 11, wherein, the apparatus is configured for acquiring the allocated Measurement ID according to the resource status information, and acquiring the address of the source eNB according to the allocated Measurement ID as well as the corresponding relationship between the allocated Measurement ID and the source eNB stored in the context information.

13. The apparatus as claimed in claim 11, wherein, if the cell information to be reported corresponds to multiple RNs, the apparatus is configured for setting up uniform resource status information according to respective resource status information from the multiple RNs and sending the uniform resource status information to the source eNB according to the address of the eNB; or, if the cell information to be reported corresponds to one RN, the apparatus is configured for sending the resource status information from the RN directly to the source eNB according to the address of the eNB.

14. The apparatus as claimed in claim 10, wherein, if the cell information to be reported corresponds to multiple RNs, a Measurement ID is allocated to each RN when the DeNB allocates the Measurement ID to the source eNB; wherein the corresponding relationships between the allocated Measurement ID of the source eNB stored in the context information are respective relationships between the allocated Measurement ID of the source eNB and respective Measurement IDs allocated to respective RNs; or, if the cell information to be reported corresponds to one RN, a Measurement ID is allocated to the RN when the DeNB allocates the Measurement ID to the source eNB; wherein the corresponding relationship between the allocated Measurement ID and Measurement ID corresponding to the Measurement ID allocated to the source eNB stored in the context information is a relationship between the Measurement ID of the source eNB and the Measurement ID allocated to the RN.

15. The apparatus as claimed in claim 9, wherein, if the cell information to be reported corresponds to multiple RNs, the apparatus is configured for setting up a resource status request message corresponding to each RN according to a resource status request message from the source eNB and sending a corresponding resource status request message to each RN respectively; or, if the cell information to be reported corresponds to one RN, the apparatus is configured for sending a resource status request message from the source eNB directly to the RN.

16. A method for realizing a resource status mapping process in a Long Term Evolution Advanced (LTE-A) system where one or more Relay Nodes (RNs) are connected with a source evolved Node B (eNB) via a Donor evolved Node B (DeNB), the method comprising:

acquiring, by the source eNB, a resource status request message; wherein the resource status request message includes cell information to be reported;

sending, by the source eNB, the resource status request message to the DeNB; and receiving, by the source eNB, resource status information returned by the DeNB according to context information;

wherein the DeNB allocates a Measurement ID to the source eNB according to the resource status request message, wherein the DeNB establishes the context information for the source eNB, and wherein the context information stores therein the corresponding relationship between the allocated Measurement ID and the source eNB.

17. The method as claimed in claim 16, wherein the source eNB acquiring resource status request message comprises: the source eNB acquiring the cell information to be reported for all RNs and setting up a resource status request message for the cell information to be reported corresponding to all RNs; or, the source eNB acquiring the cell information to be reported for each RN and setting up resource status request messages for the cell information to be reported corresponding to each RN respectively.

* * * * *